June 22, 1965 P. J. SAVERAID 3,190,620
TRACTOR MOUNTED BULK MATERIAL MIXER
Filed July 17, 1963 3 Sheets-Sheet 1

INVENTOR
PAUL J. SAVERAID
BY
Rudolph L. Lowell
ATTORNEY

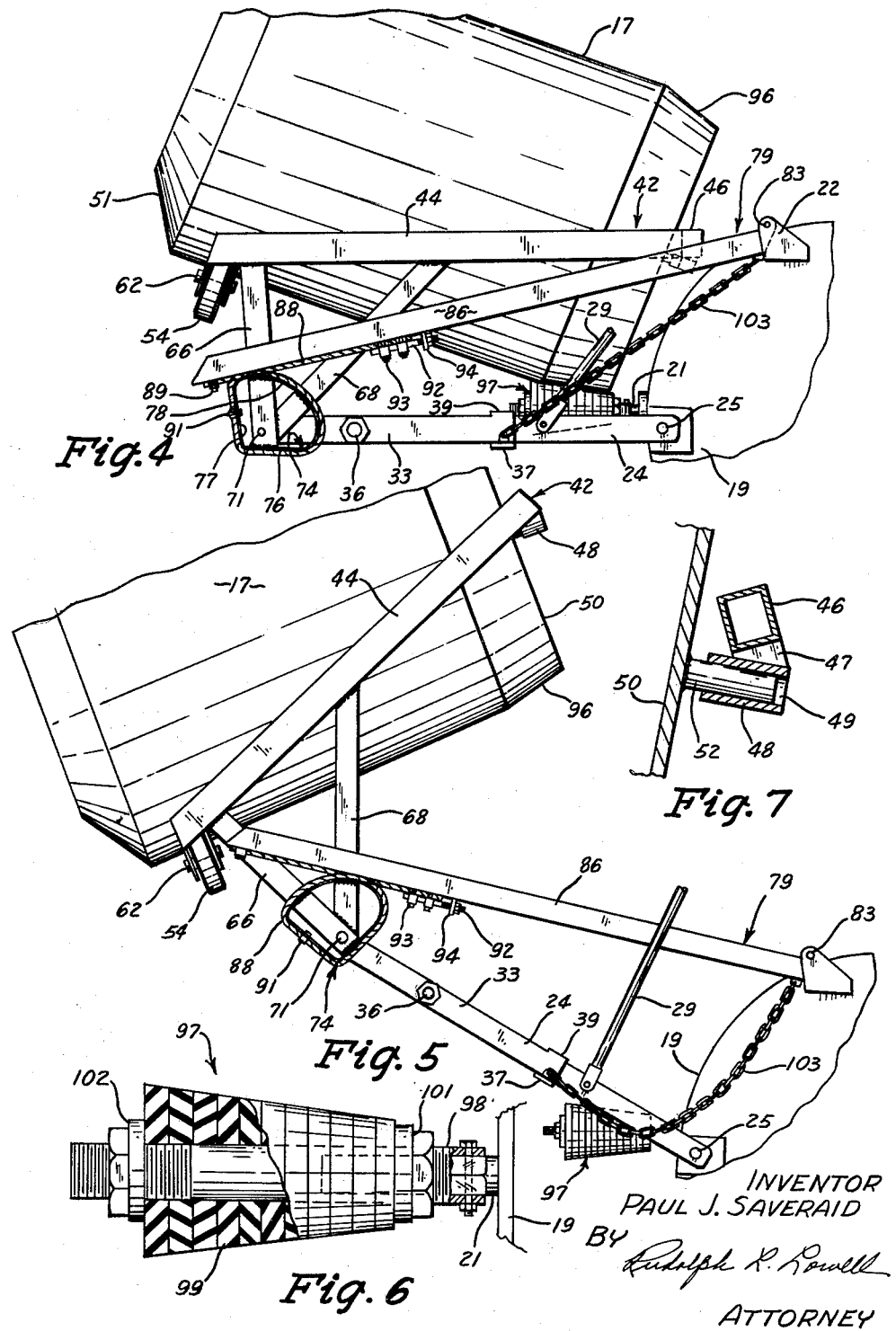

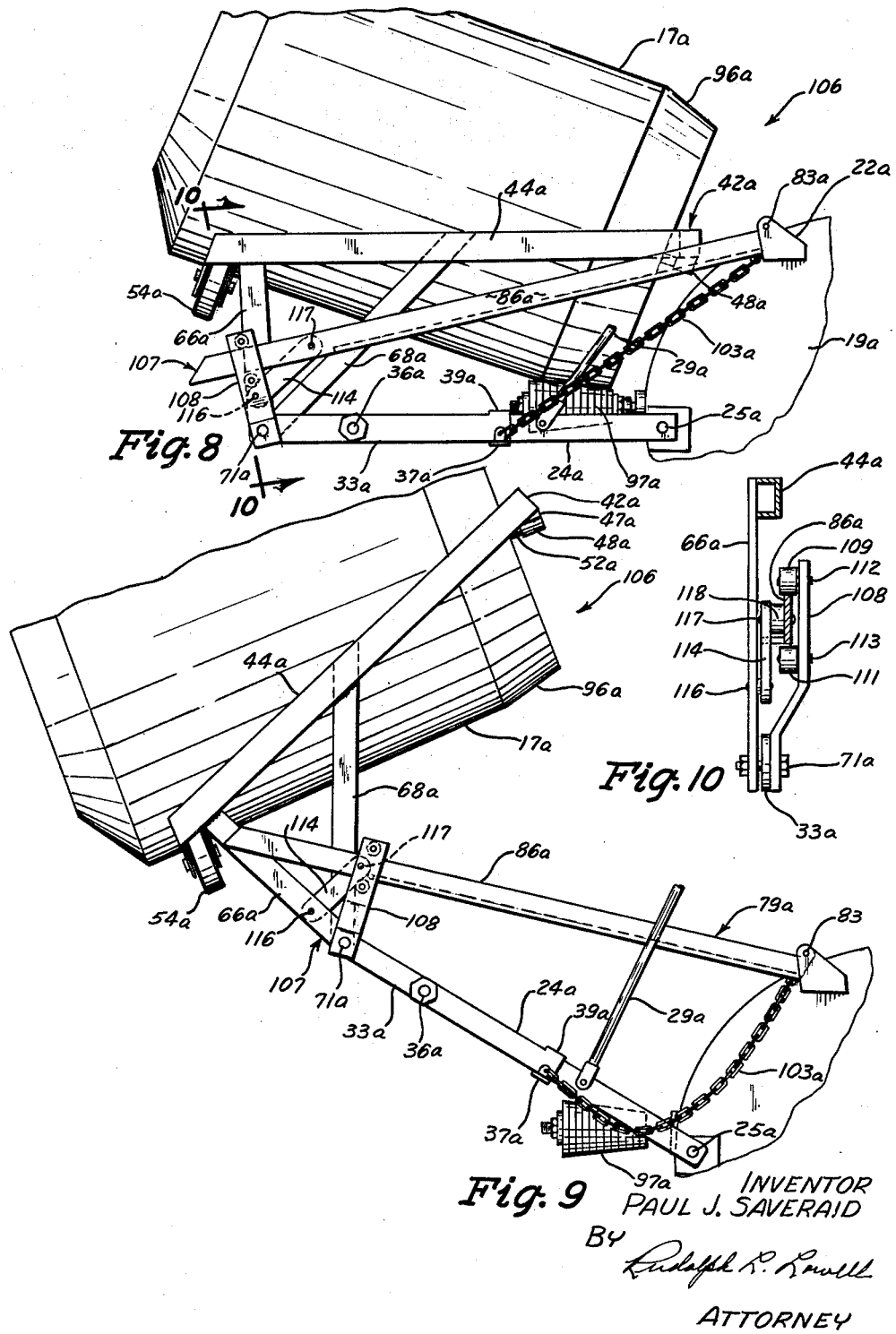

United States Patent Office 3,190,620
Patented June 22, 1965

3,190,620
TRACTOR MOUNTED BULK MATERAL MIXER
Paul J. Saveraid, Cambridge, Iowa, assignor of fifty percent to Arthur J. Saveraid, Cambridge, Iowa
Filed July 17, 1963, Ser. No. 295,730
15 Claims. (Cl. 259—171)

This invention relates to a bulk material mixer for use with a motor vehicle and more particularly to a concrete or bulk material mixer mounted on a tractor and operated from the power take-off of the tractor.

It is the object of the invention to provide an improved concrete mixer which has a mixing barrel rotatable by the power take-off of a tractor and a supporting and dumping mechanism for mounting the mixer on the draft links and transmission casing of a tractor which form a three point hitch.

Another object of the invention is to provide a supporting and dumping mechanism for a rotatable mixing barrel which is mountable on the draft links and transmission casing of a tractor forming a three point hitch and is operable in response to upward movement of the draft links to move the mixing barrel from a mix position to a dump position.

A further object of the invention is to provide in a concrete mixer, a supporting and dumping mechanism which is conveniently attached to a tractor having a three point hitch and enables the mixer to be operated by the power take-off of the tractor.

An additional object of the invention is to provide a portable concrete mixer which is mountable on a tractor, reliable and efficient in use, and compact and economical in construction.

These and other objects and advantages of this invention will become readily apparent upon reference to the following description and the accompanying drawings, wherein:

FIG. 4 is a side view of the concrete mixer of FIG. 1 with the mixing barrel illustrated in the mix position;

FIG. 5 is a view similar to FIG. 4 with the mixing barrel illustrated in the dump position;

FIG. 6 is an enlarged side view partially in section of the power take-off drive extension;

FIG. 7 is an enlarged detailed longitudinal cross sectional view of the forward bearing connection between the mixing barrel and the supporting and dumping mechanism;

FIG. 8 is a side view of a concrete mixer similar to FIG. 1 illustrated with a modified supporting and dumping mechanism for the mixing barrel and showing the mixing barrel in the mix position;

FIG. 9 is a view similar to FIG. 8 with the mixing barrel illustrated in the dump position; and FIG. 10 is an enlarged sectional view taken along the line 10—10 of FIG. 9.

Figure 1:
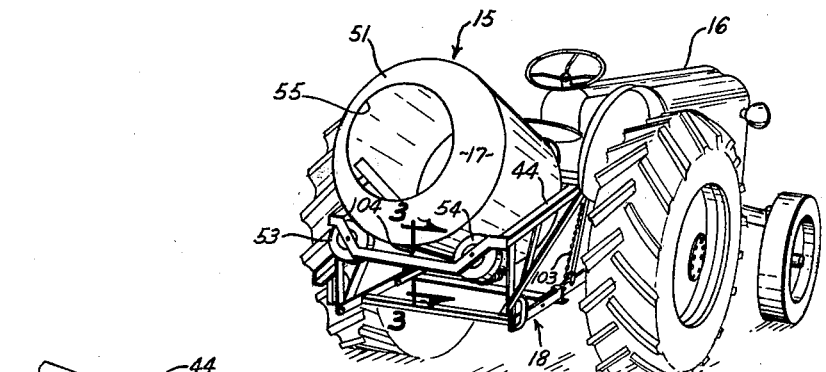
FIG. 1 is a perspective view of a tractor having mounted thereon the concrete mixer of this invention.

Referring to the drawing there is shown in FIG. 1, a bulk material mixer 15 in assembled relation with a tractor 16 having a conventional three point hitch which is operable in response to movement of an operator hydraulic control (not shown). The mixer 15 is normally used to blend or compound bulk materials such as seeds, feed, dirt, and concrete.

The mixer 15 has a generally cylindrical-shaped barrel 17 rotatably mounted on a supporting and dumping mechanism 18 which is mounted on the three point hitch of tractor 16.

Figure 2:
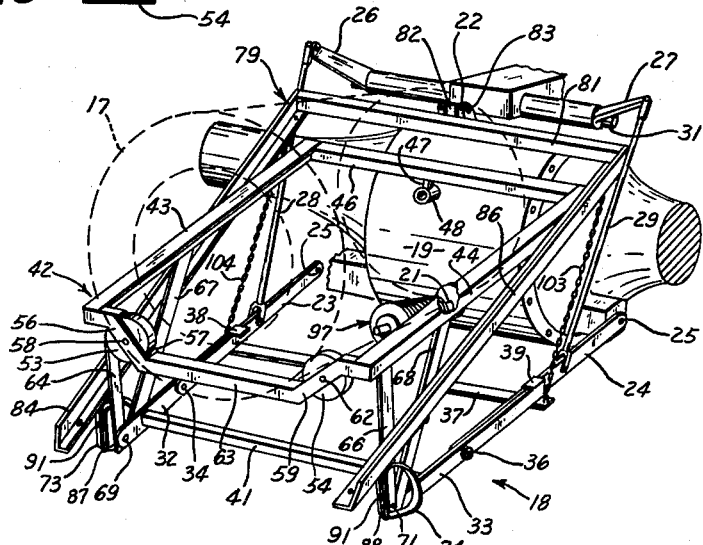
FIG. 2 is an enlarged perspective view of the supporting and dumping mechanism for the mixing barrel of the concrete mixer of FIG. 1.

As shown in FIG. 2 the rear portion of the vehicle 16 includes a transmision casing 19 having a rearwardly extended power take-off shaft 21. The upper center portion of the transmission casing 19 has a pair of spaced upwardly extended ears 22 which form a pivotal connection for a control link (not shown) of a conventional three point hitch. Pivotal mounted on the opposite sides of the transmission casing 19 are a pair of rearwardly extended draft links 23 and 24. Pins 25 connect the draft links 23 and 24 to the casing 19. The position of the draft links 23 and 24 is controlled by a pair of lift arms 26 and 27 which are connected to the mid-sections of the draft links by lift links 28 and 29, respectively. The lift arms 26 and 27 are secured to a transverse shaft 31 which projects laterally in opposite directions from the top section of the transmission casing 19. The shaft 31 is operatively connected to a hydraulic cylinder mechanism (not shown) which is operable to rotate the shaft 31 to effect angular movement of the lift arms 26 and 27 whereby to raise and lower the lift links 28 and 29.

The supporting and dumping mechanism 18 comprises a draft frame which includes a pair of flat bar or plate members 32 and 33 positioned adjacent the outside surface of the draft links 23 and 24 and extend rearwardly therefrom. Pins 34 and 36 connect the mid-sections of the plate members 32 and 33 to the end of the draft links 23 and 24, respectively. In order to maintain the plate members 32 and 33 in longitudinal alignment with the draft links 23 and 24, respectively, the forward end of the plate members 32 and 33 are connected by a transverse plate 37 which engages the lower side of the draft links 23 and 24. Inwardly extended tabs 38 and 39 are secured to the top of the forward ends of the plate members 32 and 33 and engage the upper sides of the draft links 23 and 24, respectively. The rear ends of the plate members 32 and 33 are maintained in a spaced relationship by a transverse brace 41 which is secured to and extended between the plate members 32 and 33.

Pivotally mounted on the rear ends of the plate members 32 and 33 is a barrel supporting frame indicated generally by the numeral 42. The frame 42 is positioned above the draft links 23 and 24 and comprises a pair of longitudinally extended side beams 43 and 44. A transverse beam 46 is secured at its opposite ends to the forward ends of the side beams 43 and 44. Extended downwardly from the mid-section of the transverse beam 46 is a lug 47 having a bearing sleeve 48. As shown in FIG. 7, the sleeve 48 has a bore 49 which extends in an upward and rearward direction when the frame 42 is in the mix position. The center section of the forward end wall 50 of the barrel 17 carries a stub shaft 52 which is positioned in the bore 49. The rear end wall 51 of the barrel 17 tapers inwardly in a rearward direction and has an opening 55 providing a passage into the barrel 17.

Figure 3:
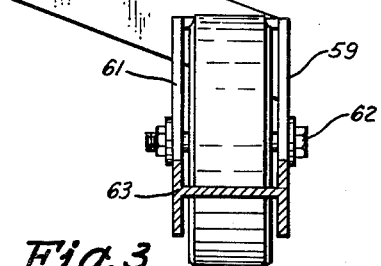
FIG. 3 is an enlarged sectional view taken along the line 3-3 of FIG. 1.

The rear end section of the barrel 17 rests upon a pair of transversely spaced rollers 53 and 54. The axis of rotation of the rollers 53 and 54 is substantially parallel to the peripheral surface of the barrel 17 so as to maintain the barrel on the frame 42. The roller 53 is positioned between a pair of plates 56 and 57 which are secured to the outer end of the side beam 43 and extend in an inward and downward direction and is rotatably mounted on a bolt 58 which extends through the plates. As shown in FIG. 3, the roller 54 is positioned between a pair of spaced plates 59 and 61 which are secured to the side beam 44 and extend in an inward and downward direction and is rotatably mounted on a bolt 62 which extends through the plates. An I-beam 63 positioned below the horizontal plane of the side beams 43 and 44 is secured at one end to the plates 56 and 57 and at the other end to the plates 59 and 61.

A pair of downwardly extended legs 64 and 66 are secured to the rear ends of the side beams 43 and 44, respectively. The legs 64 and 66 are reinforced by diagonal braces 67 and 68 secured to the lower ends of the legs 64 and 66 and extend upwardly and forwardly with their upper ends connected to the side beams 43 and 44. Transverse pins 69 and 71 pivotally connect the lower ends of the legs 64 and 66 to the plate members 32 and 33, respectivley.

As shown in FIG. 2, arcuate segment 73 is secured to the lower ends of leg 64 and brace 67, and an arcuate segment 74 is secured to the lower ends of leg 66 and brace 68. Since the segments 73 and 74 are identical in shape the following desscription is limited to segment 74 which is best illustrated in FIG. 4. The segment 74 has a substantially horizontal forwardly extended base section 76, and an upright section 77 which is angularly spaced from the base section 76 by an angle slightly more than 90°. The base section 76 is below the pivot pin 71 and the upright section rearwardly of the pin 71. A convex curved section 78 connects the upper end of the upright section 77 with the forward end of the base section 76.

As shown in FIG. 2, a U-shaped control frame or link indicated generally by the reference numeral 79 is pivotally connected to the tractor transmission casing 19 and extends rearwardly in a straddling relation over the barrel supporting frame 42. The control link 79 has a transverse member 81 which has a forwardly extended projection 82 secured to its mid-section. The projection 82 extends into the space between the pivot ears 22 and is pivotally mounted thereon by a transverse pin 83. The angle beams 84 and 86 extend rearwardly adjacent the outside of the side beams 43 and 44. The outer end section of each angle beam is positioned over the associated arcuate segment and extends rearwardly therefrom.

The rear end section of the angle beams 84 and 86 are connected to the arcuate segments 73 and 74, respectively, by cables 87 and 88 which have one of their ends secured to corresponding angle beam 84 and 86 and the intermediate sections of which are then wound around an associated arcuate segment. As shown in FIG. 4, the cable 88 is secured at its one end to the angle beam 86 by a clamp 89. From the clamp 89 the intermediate section of the cable extends around the convex curved section of the arcuate segment 74. A U-bolt clamp 91 secures the cable 88 to the upright section 77. From the arcuate segment 74 the cable 88 extends forwardly along the bottom of the angle beam 86 and has its opposite end adjustably connected thereto by a bolt and nut assembly 92 which is secured at one end to the cable 88 by clamp 93. The opposite end of the assembly 92 extends through a tab 94 secured to the angle beam 86. The tension on the cable 88 is adjusted by turning the nut of the assembly 92.

As shown in FIG. 4, the mixing barrel 15 has a slight inward tapered forward end section 96 which engages a cone-shaped drive member 97. The drive member 97 is in frictional engagement with the inwardly tapered end section 96 of the barrel and functions to rotate the barrel. As shown in FIG. 6, the drive member 97 has a central sleeve 98 which is positioned about and drivably connected to the power take-off drive shaft 21. Stacked on the sleeve 98 are a plurality of resilient discs 99 formed from material such as a tire carcass. The discs 99 are clamped between a pair of nut and washers 101 and 102 which are threadably mounted on the sleeve 98.

In order to limit the weight of the barrel 17 on the drive member 97 the barrel 17 is held in the mix position, as shown in FIG. 4, by flexible links or chains 103 and 104 which are connected at their upper ends to the transverse member 81 and at their lower ends to the ends of the transverse plate 37. The chains 103 and 104 have a predetermined length and function to limit the downward movement of the draft links 23 and 24.

In use the mixing barrel 17 rotates about a rearwardly and upwardly extended axis with the tapered end section 96 being in frictional engagement with the discs 99 of the power take-off drive member 97. This axis is determined by the rotatable support of the forward end of the barrel in the bearing sleeve 48 as shown in FIG. 7 and the support of its rear end on the transversely spaced rollers 53 and 54. The mix position of the barrel 17 is maintained by a pair of chains 103 and 104 which limit the downward movement of the draft links 23 and 24. As shown in FIG. 4, when the chains 103 and 104 are taut the relative movement between the control link 79 and the barrel frame 42 is terminated.

In order to move the barrel 17 to a dump position, as shown in FIG. 5, the operator of the tractor 16 adjusts the hydraulic controls to pivot the draft links 23 and 24 about the pivot pins 25 so as to move the plates 32 and 33 in an upward direction. The angle beams 84 and 86 of the control link 79 are pivoted about the pin 83 as the outer end section of each angle beam engages the corresponding arcuate segments 73 and 74, respectively. Since the draft links 23 and 24 and the control link 79 pivot about separate axes the different arcs subscribed by the rear ends of the links 23 and 24 and the link 79 intersect and diverge in an upward direction. This difference in the subscribed arcs effects a relative translatory linear movement of the control link 79 with respect to the transverse pivot pins 69 and 71. This linear movement is converted to arcuate movement of the barrel frame 42 by the segments 73 and 74 and the cables 87 and 88, respectively. As shown in FIG. 5, the barrel supporting frame 42 is rotated about the pin 71 moving the mixing barrel 17 to a dump position wherein its axis of rotation extends rearwardly and downwardly.

During the lifting of the draft links 23 and 24 the curved section of the arcuate segments 73 and 74 maintain the space between the angle beams 84 and 86 and the pivot pins 69 and 71. The cables 87 and 88 which extend around the arcuate segments 73 and 74, respectively, form a driving connection between the angle beams 84 and 86 and the arcuate segments 73 and 74 which utilize the relative translatory linear movement between the angle beams and the pivot pins 69 and 71 to rotate the barrel frame 42. During relative movement between the angle beams 84 and 86 the opposite end sections of the cables 87 and 88 are positioned around and removed from the corresponding arcuate segments.

When the mixing barrel 17 is moved from the dump position as shown in FIG. 5 to the mix position as shown in FIG. 4 the draft links 23 and 24 are lowered effecting a relative movement between the control link 74 and the transverse pivot pins 69 and 71. The forward ends of the cables 87 and 88 are unwound from their respective arcuate segments while the rear end sections of the cables are wound onto the arcuate segments. Since the cables are clamped by the U-bolts 91 to the respective arcuate segments the barrel frame 42 is pivoted about the pins 69 and 71 until the tapered end section 96 engages the drive member 97 as shown in FIG. 4.

The bulk material mixer 106 shown in FIGS. 8, 9, and 10 has a modified supporting and dumping mechanism 107. The mixer 106 is similar in construction to the mixer 15 and identical structure is indicated with the same reference number having the suffix a.

As shown in FIG. 8, the mixing barrel 17a is in the mix position. The tapered end section 96a is in frictional engagement with the drive member 97a. The barrel supporting frame 42a extends about the barrel and carries a roller 54a and the sleeve 48a which rotatably mount the barrel 17a on the frame 42a.

An upwardly and rearwardly extended offset arm 108 is secured to the end of the plate member 33a. As shown in FIG. 10, the arm 108 is laterally spaced adjacent the upright flange of the angle beam 86a and carries a pair of spaced guides or roller members 109 and 111 which respectively engage the upper and lower edges of the beam 86a thereby maintaining a fixed spaced relation between the beam 86a and the pivot pin 71a. The roller members 109 and 111 are supported on transverse pins 112 and 113 respectively, each of which is secured to the arm 108.

The inwardly extended flange of the rear end section of the angle beam 86a has been partially removed to provide space for a force transmitting link 114 which connects the beam 86a to the upright leg 66a of the barrel frame 42a. As shown in FIG. 10, the link 114 is pivotally connected to the lower section of the leg 66a by a pin 116. The forward end of the link 114 is connected to the beam 86a forwardly of the arm 108 by a pin 117. A washer 118 is interposed between the link 114 and the beam 86a to maintain a straight line position of the link 114. The opposite side of the supporting and dumping mechanism 107 is identical in construction to the structure shown in FIG. 8 and has an upwardly extended offset arm for supporting the opposite angle beam of the control link 79a.

In order to move the mixing barrel 17a to the dump position as shown in FIG. 9 the draft links 24a are rotated in an upward direction about the pivot pin 25a. The arm 108 rotates the beam 86a about the pivot pin 83a. The resultant relative linear movement between the beam 86a and the pivot pin 71a rotates the barrel supporting frame 42a about the pin 71a through the force transmitting link 114. The beam 86a rides on the roller members 109 and 111 so as to move the link 114 in a rearward direction.

When the draft links are lowered the beam 86a carries the link 114 in a forward direction thereby pivoting the barrel supporting frame 42a in a clockwise direction as shown in FIG. 9 until the tapered end section 96a engages the drive member 97a.

While there have been shown, described, and pointed out the fundamental features of the invention, it is to be understood that various omissions, substitutions, changes in form, and details of the apparatus illustrated may be made by those skilled in the art without departing from the spirit of the invention. It is intended to be limited only as indicated by the scope of the following claims.

I claim:

1. A bulk material mixer for use with a tractor equipped with a power take-off drive, vertically movable pivoted draft links and a control link pivot comprising:
   (a) barrel means movable from a mix position wherein a portion of the barrel means is in driven engagement with said power take-off drive to a dump position,
   (b) first frame means mounted on the draft links and having a section extended rearwardly from said draft links,
   (c) second frame means pivotally mounted on the extended section of the first frame means,
   (d) means on said second frame means for rotatably supporting said mixing barrel,
   (e) control link means pivotally connected to the control link pivot and extended rearwardly from said pivot, and
   (f) means operative to connect the control link means and the second frame means whereby upon upward movement of the draft links the second frame means pivots on the first frame means moving the mixing barrel to the dump position.

2. The mixer defined in claim 1 wherein said connecting means comprises:
   (a) arcuate segment means positioned about the pivot of the second frame means and secured to said second frame means, and
   (b) cable means having a section extended about and secured to a portion of said arcuate segment means, and opposite end sections secured to said control link means whereby upon vertical movement of the draft links in an upward direction the control link means applies a force on the cable means to pivot the second frame means whereby to move the barrel from a mix position to a dump position.

3. The mixer defined in claim 1 wherein said connecting means comprises:
   (a) upwardly projected arm means secured to the rear section of the first frame means,
   (b) guide means mounted on the upper section of said arm means and engageable with said control link means to hold said control link means above said pivot of the second frame means, and
   (c) force transmitting link means pivotally connected to said second frame means and said control link means whereby upon upward movement of the draft links the control link moves the force transmitting link means to pivot the second frame means moving the barrel from a mix position to a dump position.

4. A bulk material mixer for use with a tractor equipped with vertically movable pivoted draft links and a control link pivot comprising:
   (a) barrel means movable from a mix position to a dump position,
   (b) a draft frame secured to and extended rearwardly from said draft links,
   (c) a barrel supporting frame positioned above said draft frame,
   (d) means on said barrel supporting means for rotatably supporting said barrel means,
   (e) a pair of downwardly projected transversely spaced legs at the rear of said barrel supporting frame,
   (f) means pivotally connecting said legs to said draft frame,
   (g) a control frame of U-shape positioned in a straddling relation with the barrel supporting frame,
   (h) means pivotally connecting the control frame to the control link pivot, and
   (i) motion transmitting means operatively connected with said legs adjacent said leg pivot means and with said control frame whereby upon upward movement of the draft links the relative translatory linear movement of the control frame with respect to the leg pivot means is converted to arcuate movement of the barrel frame thereby moving the barrel means to the dump position.

5. A support and dump mechanism for a mixing barrel of a bulk material mixer mounted on a tractor equipped with vertically movable pivoted draft links and a control link pivot comprising:
   (a) a draft frame secured to and extended rearwardly from said draft links,
   (b) a barrel supporting frame positioned above said draft frame,
   (c) a pair of downwardly projected transversely spaced legs at the rear of said barrel supporting frame,
   (d) means pivotally connecting said legs to said draft frame,
   (e) a control frame of U-shape positioned in a straddling relation with the barrel supporting frame,
   (f) means pivotally connecting the control frame to the control link pivot, and
   (g) motion transmitting means operatively connected with said legs adjacent said leg pivot means and with said control frame whereby upon upward movement of the draft links the relative translatory linear movement of the control frame with respect to the leg pivot means is converted to arcuate movement of the barrel frame thereby moving the barrel means to the dump position.

6. A support and dump mechanism for a mixing barrel of a bulk material mixer mounted on a tractor equipped with vertically movable draft links and a control link pivot comprising:
- (a) first frame means connected to the draft links and having a rear section extended rearwardly from said draft links,
- (b) second frame means pivotally mounted on said rear section of the first frame means,
- (c) means on said second frame means rotatably supporting said mixing barrel,
- (d) control link means pivotally connected to the control link pivot and extended rearwardly from said pivot adjacent said second frame means,
- (e) arcuate segment means positioned about the pivot of the second frame means and secured to said second frame means, and
- (f) cable means having a section extended about and secured to a portion of said arcuate segment means, and opposite end sections secured to said control link means whereby upon vertical movement of the draft links in an upward direction the control link means applies a force on the cable means to pivot the second frame means whereby to move the barrel from a mix position to a dump position.

7. The mechanism defined in claim 6 including:
- (a) flexible link means of a predetermined length connected to the control link means and the first frame means for limiting the downward movement of the draft links thereby determining the mix position of the barrel.

8. A support and dump mechanism for a mixing barrel of a bulk material mixer mounted on a tractor equipped with vertically movable draft links and a control link pivot comprising:
- (a) first frame means connected to the draft links and having a rear section extended rearwardly from said draft links,
- (b) second frame means pivotally mounted on said rear section of the first frame means,
- (c) means on said second frame means rotatably supporting said mixing barrel,
- (d) control link means pivotally connected to the control link pivot and extended rearwardly from said pivot adjacent said second frame means,
- (e) upwardly projected arm means secured to the rear section of the first frame means,
- (f) guide means mounted on the upper section of said arm means and engageable with said control link means to hold said control link means above said pivot of the second frame means, and
- (g) force transmitting link means pivotally connected to said second frame means and said control link means whereby upon upward movement of the draft links the control link moves the force transmitting link means to pivot the second frame means moving the barrel from a mix position to a dump position.

9. The mechanism defined in claim 8 including:
- (a) flexible link means of a predetermined length connected to the control link means and the first frame means for limiting the downward movement of the draft links thereby determining the mix position of the barrel.

10. A support and dump mechanism for mounting a mixing barrel on a tractor equipped with a pair of vertically movable draft links and a control link pivot comprising:
- (a) pair of plate members one of which is secured to each draft link to form rearwardly extended longitudinal extensions thereof,
- (b) frame means having a pair of downwardly extended legs,
- (c) means on said frame means rotatably supporting said mixing barrel,
- (d) a pair of pivot means connecting the legs of the frame means with the extensions of the plate members,
- (e) a U-shaped control link means pivotally connected to the control link pivot with the legs thereof in a straddling relation with the frame means,
- (f) a pair of arcuate segment means corresponding to said pivot means, one of said segment means secured to a corresponding leg of the frame means, each of said segment means having a convex section operatively associated with said control link means to hold said control link means above said pivot means, and
- (g) cable means having a section extended about and secured to a portion of said segment means, and opposite end sections of the cable means secured to longitudinally spaced portions of the control link means whereby upon upward movement of the draft links the control link means applies a force on the cable means to pivot the second frame means about said pivot whereby to move the barrel from a mix position to a dump position.

11. The mechanism defined in claim 10 including:
- (a) flexible link means of a predetermined length connected to the forward ends of the plate members and the forward ends of the control link means for limiting the downward movement of the draft links thereby determining the mix position of the barrel.

12. A support and dump mechanism for mounting a mixing barrel on a tractor equipped with a pair of vertically movable draft links and a control link pivot comprising:
- (a) a pair of plate members one of which is secured to each draft link to form longitudinal extensions thereof, each plate member having a rear section extended rearwardly from said draft link,
- (b) frame means having a pair of downwardly extended legs,
- (c) means on said frame means rotatably supporting said mixing barrel,
- (d) a pair of pivot means connecting the legs of the frame means with rear sections of the plate members,
- (e) a U-shaped control link means pivotally connected to the control link pivot and extended rearwardly adjacent the legs of the frame means,
- (f) upwardly and rearwardly projected arm means secured to each of said rear sections of the plate members,
- (g) roller means mounted on the upper section of each arm means and engageable with said control link means to hold said control link means above said pivot means, and
- (h) force transmitting link means pivotally connected to the legs of the frame means and to the control link means whereby upon upward movement of the draft links the control link moves the force transmitting link means to pivot the second frame means about said pivot means moving the barrel from a mix position to a dump position.

13. The mechanism defined in claim 12 including:
- (a) flexible link means of a predetermined length connected to the forward ends of the plate members and the forward ends of the control link means for limiting the downward movement of the draft links thereby determining the mix position of the barrel.

14. A bulk material mixer for use with a tractor equipped with vertically movable rearwardly extended pivoted draft links and a control link pivot comprising:
- (a) barrel means movable from a mix position to a dump position,
- (b) frame means pivotally mounted on the rear ends of said draft links,
- (c) means on said frame means for rotatably supporting said mixing barrel,
- (d) control link means pivotally connected to the control link pivot and extended rearwardly from said pivot, and (e) means operative to connect the control link means and the frame means whereby upon upward movement of the draft links the frame means pivots on the draft links to move the mixing barrel to the dump position.

15. A tilting mechanism for use with a tractor equipped with vertical movable rearwardly extended pivoted draft links and a control link pivot comprising:
(a) a tiltable frame movable from a substantially horizontal first position to an upwardly and forwardly inclined second position,
(b) means pivotally mounting said tiltable frame on the rear ends of said draft links so that it extends forwardly from said mounting means,
(c) control link means pivotally connected for up and down movement to the control link pivot and extended rearwardly from said pivot, and
(d) means movably connecting the control link means and said draft links with the tiltable frame whereby upon upward pivotal movement of the draft links the tiltable frame is pivoted on the draft links from the first position to the second position thereof.

References Cited by the Examiner
UNITED STATES PATENTS
2,656,164   10/53   Knowlton _____ 259—171

CHARLES A. WILLMUTH, *Primary Examiner.*